(12) United States Patent
Cho et al.

(10) Patent No.: US 12,715,599 B2
(45) Date of Patent: Aug. 25, 2026

(54) FLIGHT SYSTEM AND METHOD FOR RESPONDING FAILURE THEREOF

(71) Applicants: Hyundai Motor Company, Seoul (KR); Kia Corporation, Seoul (KR)

(72) Inventors: Hyun Ki Cho, Anyang-Si (KR); Jin Soo Jang, Yongin-Si (KR); Yoon Cheol Jeon, Suwon-Si (KR); Jong Pil Kim, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 166 days.

(21) Appl. No.: 18/386,074

(22) Filed: Nov. 1, 2023

(65) Prior Publication Data

US 2024/0343403 A1 Oct. 17, 2024

(30) Foreign Application Priority Data

Apr. 17, 2023 (KR) ........................ 10-2023-0050162

(51) Int. Cl.
*B64D 31/10* (2006.01)
*B64D 31/16* (2024.01)

(52) U.S. Cl.
CPC ............ *B64D 31/10* (2013.01); *B64D 31/16* (2024.01); *B64D 2221/00* (2013.01)

(58) Field of Classification Search
CPC .... B64D 31/00; B64D 2221/00; B64D 31/16; B64D 27/34
See application file for complete search history.

(56) References Cited

U.S. PATENT DOCUMENTS

| | | | | |
|---|---|---|---|---|
| 6,992,403 | B1 | 1/2006 | Raad | |
| 10,131,441 | B2 * | 11/2018 | Edwards | B64D 27/31 |
| 10,513,342 | B2 * | 12/2019 | Joubert | G05D 1/0072 |
| 11,447,015 | B1 | 9/2022 | Wiegman et al. | |
| 12,149,193 | B1 * | 11/2024 | Lueneburg | H02P 27/06 |
| 12,371,177 | B2 * | 7/2025 | Trawick | B64D 27/33 |
| 2016/0340051 | A1 | 11/2016 | Edwards et al. | |
| 2018/0162525 | A1 | 6/2018 | St. Clair et al. | |
| 2018/0305033 | A1 * | 10/2018 | Joubert | G05D 1/0072 |
| 2022/0126998 | A1 | 4/2022 | Jung et al. | |
| 2022/0224206 | A1 * | 7/2022 | Liu | H01L 23/50 |
| 2024/0246658 | A1 * | 7/2024 | Martin | B64D 27/357 |

FOREIGN PATENT DOCUMENTS

| | | | |
|---|---|---|---|
| CN | 112173094 | A | 1/2021 |
| EP | 3950500 | A1 | 2/2022 |
| JP | 4085799 | B2 | 5/2008 |
| KR | 102101349 | B1 | 4/2020 |
| KR | 10-2020-0058204 | A | 5/2020 |
| KR | 102135837 | B1 | 7/2020 |
| KR | 102370070 | B1 | 3/2022 |

OTHER PUBLICATIONS

Apr. 30, 2024—(EP) European Search Report—App No. 23211688.9.

* cited by examiner

*Primary Examiner* — Thai T Dinh
(74) *Attorney, Agent, or Firm* — Banner & Witcoff, Ltd.

(57) ABSTRACT

The present disclosure relates to a flight system and a failure responding method therefor. A flight system includes: a plurality of fuse boxes configured to control application of a voltage to at least one propulsion device; and an interlock control apparatus configured to control interlock lines between fuse boxes connected using the interlock lines among the fuse boxes to synchronize and control opening of the fuse boxes connected using the interlock lines.

20 Claims, 10 Drawing Sheets

FLIGHT SYSTEM AND METHOD FOR RESPONDING FAILURE THEREOF

CROSS-REFERENCE TO RELATED APPLICATION

This application claims priority to and the benefit of Korean Patent Application No. 10-2023-0050162, filed in the Korean Intellectual Property Office on Apr. 17, 2023, the entire contents of which are incorporated herein by reference.

BACKGROUND

A flying system includes an aircraft that has occupants (e.g., including pilots and passengers) on board and can fly (drive) autonomously or semi-autonomously, and an unmanned flying object (e.g., an unmanned aerial vehicle or unmanned aircraft system) that can fly autonomously by an external control or program without occupants on board. Accordingly, such an autonomous flying object may be used in various fields such as visiting and investigating areas where it is difficult for humans to fly directly to perform missions, meteorological observation, planetary exploration, aerial photography, etc.

Such a flying system may apply a distributed propulsion device to ensure safe take-off and landing and flight control performance, in order to ensure the safety of these distributed propulsion device (e.g., flight control maintenance), if a failure occurs in some propulsion devices (inverters, motors, rotors, etc.), power to a failed propulsion device needs to be cut off within a specified period of time.

Accordingly, in some implementations, a controller may determine whether a propulsion device has failed at regular intervals, and cut off power by controlling an active fuse corresponding to each propulsion device.

As such, the controller may transmit a command signal to the active fuse after determining the failure of the propulsion device to cut off the active fuse, thereby cutting off the power to the propulsion device, resulting in a problem in that a delay occurs according to a time when a command is transferred to each active fuse, or the like.

SUMMARY

The following summary presents a simplified summary of certain features. The summary is not an extensive overview and is not intended to identify key or critical elements.

One or more aspects of the present disclosure are directed to a flight system and a failure responding method therefor, and a technique for responding to a failure in a propulsion device (an inverter, a motor, a rotor, etc.) of a flying system.

According to one or more aspects of the present disclosure, a flight system and a failure responding method therefor may be capable of ensuring flight safety by cutting off power to a propulsion device within a predetermined time with origin symmetry or X-axis symmetry according to a speed of a flying system in case of failure of some propulsion devices (e.g. inverters, motors, rotors, etc.).

According to one or more aspects of the present disclosure, a flight system and a failure responding method therefor may be capable of performing control such that a failed propulsion device and a propulsion device that is origin-symmetrical or X-axis symmetrical thereto are blocked together by configuring interlock lines between active fuses of origin-symmetric or X-axis symmetric propulsion devices, thereby securing safety of the propulsion device after power is cut off due to a failure of one propulsion device.

The technical objects of the present disclosure are not limited to the objects mentioned above, and other technical objects not mentioned may be clearly understood by those skilled in the art in light of the present disclosure.

A flight system may comprise: a plurality of fuse boxes, wherein each fuse box, of the plurality of fuse boxes, is configured to control application of a voltage to at least one propulsion device of a plurality of propulsion devices; and an interlock control apparatus configured to control connection of at least one interlock line between at least two fuse boxes, of the plurality of fuse boxes, connected via the at least one interlock line to control opening of the at least two fuse boxes.

The flight system may be comprised in a flying vehicle. At least two propulsion devices associated with the at least two fuse boxes may be symmetrically positioned based on: a line symmetry associated with a roll axis of the flying vehicle; or a point symmetry associated with a center of the plurality of propulsion devices.

Each of the at least two fuse boxes may comprise: a voltage conducting portion to which a voltage is applied; a fuse driver configured to open the voltage conducting portion; and a fuse driving controller configured to control the fuse driver.

The flight system may comprise an interlock line input terminal configured to receive a voltage from an interlock line of a corresponding fuse box of the at least two fuse boxes; and an interlock line output terminal configured to output a voltage to the interlock line of the corresponding fuse box.

The fuse driver may be configured to be inserted into the fuse drive controller and to be protruded by being controlled by the fuse driving controller.

A first propulsion device of the plurality of propulsion devices may be coupled to a first fuse box of the at least two fuse boxes, a second propulsion device of the plurality of propulsion devices may be coupled to a second fuse box of the at least two fuse boxes, and based on the first fuse box and the second fuse box being coupled to each other via the at least one interlock line, the first fuse box and the second fuse box may be configured to be in closed states during normal operating states of the first propulsion device and the second propulsion device.

In response to opening of the first fuse box by a failure of the first propulsion device, the at least one interlock line coupled between the first fuse box and the second fuse box may be configured to be opened.

In response to opening of the at least one interlock line coupled between the first fuse box and the second fuse box, the second fuse box may be configured to be opened by the interlock control apparatus to cut off power to the second propulsion device.

The interlock control apparatus may be coupled between the first fuse box and the second fuse box via the at least one interlock line.

The interlock control apparatus may be coupled to an interlock input terminal of the first fuse box and an interlock output terminal of the second fuse box.

The interlock control apparatus may comprise a switching device configured to be: turned off based on a short-circuit of the at least one interlock line, and turned on based on opening of the at least one interlock line, to apply a control power to a fuse driving controller of the first fuse box and a fuse driving controller of the second fuse box.

The switching device may be configured: to be controlled by voltages of an interlock input terminal of the first fuse box and an interlock output terminal of the second fuse box, and to apply a control voltage to the fuse driving controller of the first fuse box and the fuse driving controller of the second fuse box.

The flight system may comprise a controller configured to transmit, based on a failure of the at least one propulsion device, an enable signal to a fuse driving controller of a fuse box connected to a failed propulsion device.

The flight system may comprise a resistor having a first end connected to an interlock input terminal of the first fuse box and having a second end connected to an interlock output terminal of the second fuse box.

Each of the at least two fuse boxes may comprise an active fuse.

The at least one propulsion device may comprise at least one of a motor, a rotor, an inverter, or any combination thereof.

The flight system may be configured to: control, based on a failure of a first propulsion device of the at least one propulsion device, a first fuse box connected to the first propulsion device and a second fuse box coupled to the first fuse box via the at least one interlock line to be opened to cut off power to both the first propulsion device and a second propulsion device coupled to the second fuse box.

A method performed by a flight system may comprise: applying a voltage to at least one propulsion device of a plurality of propulsion devices, wherein each propulsion device of the plurality of propulsion devices is coupled to a fuse box of a plurality of fuse boxes, and wherein at least two fuse boxes of the plurality of fuse boxes are coupled via at least one interlock line between the at least two fuse boxes; and controlling opening of the at least two fuse boxes by controlling opening of the at least one interlock line.

The method may comprise: based on a first fuse box of the at least two fuse boxes and a second fuse box of the at least two fuse boxes being coupled to each other via the at least one interlock line, controlling the first fuse box and the second fuse box to be in closed states during normal operating states of a first propulsion device of the plurality of propulsion devices and a second propulsion device of the plurality of propulsion devices, wherein the first propulsion device is coupled to the first fuse box, and wherein the second propulsion device is coupled to the second fuse box.

The method may comprise: in response to opening of the first fuse box by a failure of the first propulsion device, controlling opening of at least one interlock line coupled between the first fuse box and the second fuse box.

According to one or more aspects of the present disclosure, it is possible to ensure flight safety by cutting off power to a propulsion device within a predetermined time with origin symmetry or X-axis symmetry according to a speed of a flying system in case of failure of some propulsion devices (e.g., inverters, motors, rotors, etc.).

According to one or more aspects of the present disclosure, it is possible to perform control such that a failed propulsion device and a propulsion device that is origin-symmetrical or X-axis symmetrical thereto are blocked together by configuring interlock lines between of origin-symmetric or X-axis symmetric propulsion devices, thereby ensuring safety of the propulsion device after power is cut off due to a failure of one propulsion device.

Furthermore, various effects that can be directly or indirectly identified through the present disclosure may be provided.

These and other features and advantages are described in greater detail below.

DETAILED DESCRIPTION OF THE EMBODIMENTS

Figure 1:
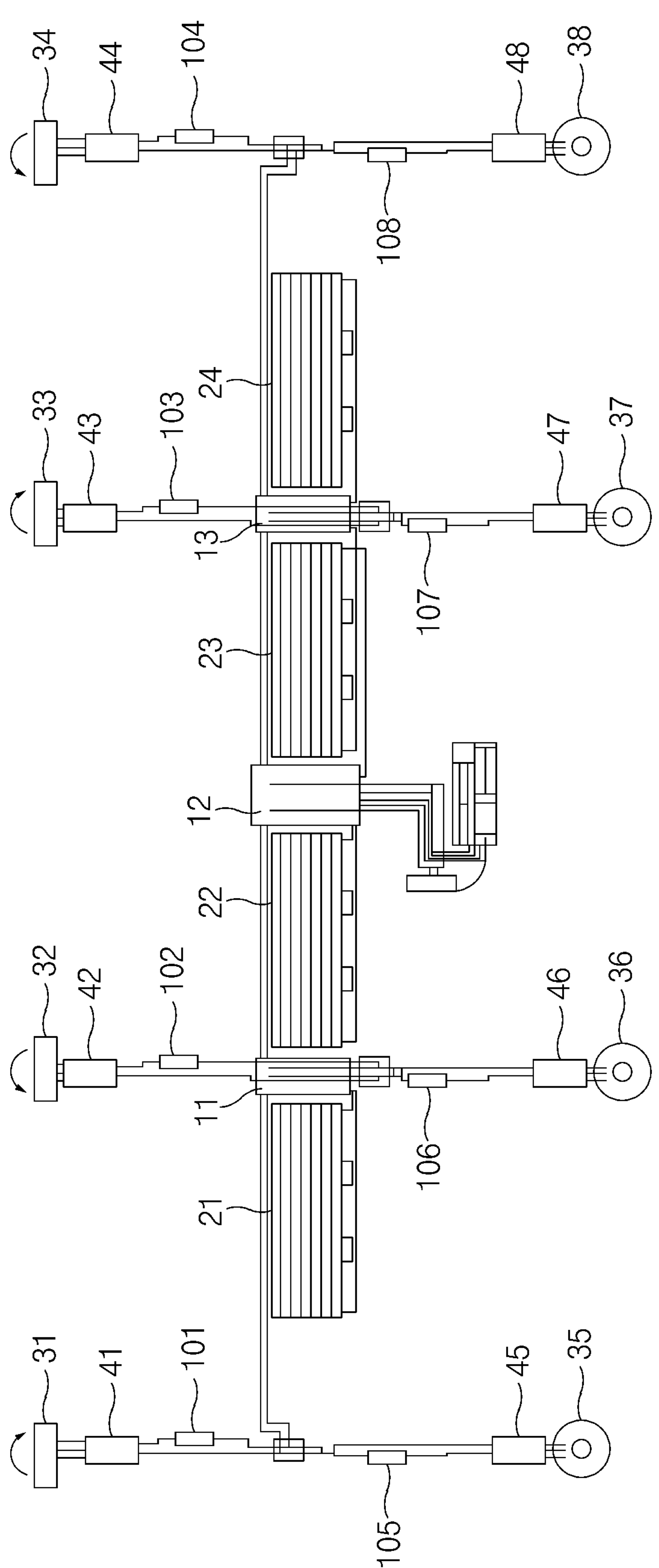
FIG. 1 illustrates a schematic diagram of an example flight system.

Hereinafter, various examples of the present disclosure will be described in detail with reference to exemplary drawings. It should be noted that in adding reference numerals to constituent elements of each drawing, the same constituent elements have the same reference numerals as possible even though they are indicated on different drawings. In one or more examples of the present disclosure, when it is determined that a detailed description of the well-known configuration or function associated with the one or more examples may obscure the gist of the present disclosure, the description thereof may be omitted.

In describing constituent elements, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which the present disclosure pertains (to those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various examples of the present disclosure will be described in detail with reference to FIG. 1 to FIG. 10.

FIG. 1 illustrates a schematic diagram of an example flight system.

A flying system may include a first kind of air mobility vehicle that has occupants, including pilots and passengers, on board and may fly autonomously or semi-autonomously, and a second kind of air mobility vehicle that may fly autonomously by an external control or a program without occupants on board. In an example, the flying system may include a helicopter, a drone, an airplane, or a vehicle that moves with wheels on the ground and can fly after it goes up in the air, and as mentioned earlier, these may include both manned and unmanned aerial vehicles.

The flight system 100 may be implemented inside or outside the flying system. In this case, the flight system 100 may be integrally formed with internal control units of the flying system, or may be implemented as a separate hardware device to be connected to control units of the flying system by one or more connectors. For example, the flight system 100 may be implemented integrally with the flying system, may be implemented in a form that is installed or attached to the flying system as a configuration separate from the flying system, or a part thereof may be implemented integrally with the vehicle, and another part may be implemented in a form that is installed or attached to the flying system as a configuration separate from the flying system. The flight system 100 may be applied to an electrically vertical take-off and landing (eVTOL) flying system.

Referring to FIG. 1, the flight system 100 may include battery packs 21, 22, 23, and 24 (e.g., connected in parallel), diagnosis circuits 11, 12, and 13 connected to the battery packs 21, 22, 23, and 24 to diagnose failures of the battery packs, motors 31, 32, 33, 34, 35, 36, 37, and 38, inverters 41, 42, 43, 44, 45, 46, 47, and 48 connected to the respective motors 31, 32, 33, 34, 35, 36, 37, and 38, and active fuses 101, 102, 103, 104, 105, 106, 107, and 108 for controlling voltages applied to the motors 31, 32, 33, 34, 35, 36, 37, and 38.

The first motor 31, the first inverter 41, the fifth inverter 45, the fifth motor 35 may be connected in series, the second motor 32, the second inverter 42, the sixth inverter #6 46, and the sixth motor 36 may be connected in series, the third motor 33, the third inverter 43, the seventh inverter 47, the seventh motor 37 may be connected in series, and the fourth motor 34, the fourth inverter 44, the eighth inverter 48, and the eighth motor 38 may be connected in series. The diagnosis circuit 11 may be disposed between the second and sixth inverters 42 and 46, and the diagnosis circuit 13 may be disposed between the third and seventh inverters 43 and 47.

The diagnosis circuit 11 may be disposed in the first battery pack 21 (or may be disposed between the first battery pack 21 and the second battery pack 22), the diagnosis circuit 12 may be disposed between the second battery pack 22 and the third battery pack 23, and the diagnosis circuit 13 may be disposed in the fourth battery pack 24 (or may be disposed between the third battery pack 23 and the fourth battery pack 24). But aspects of the present disclosure are not limited thereto. For example, at least one of the diagnosis circuits 11, 12, and 13 may be disposed in other battery packs or other elements.

Figure 2:
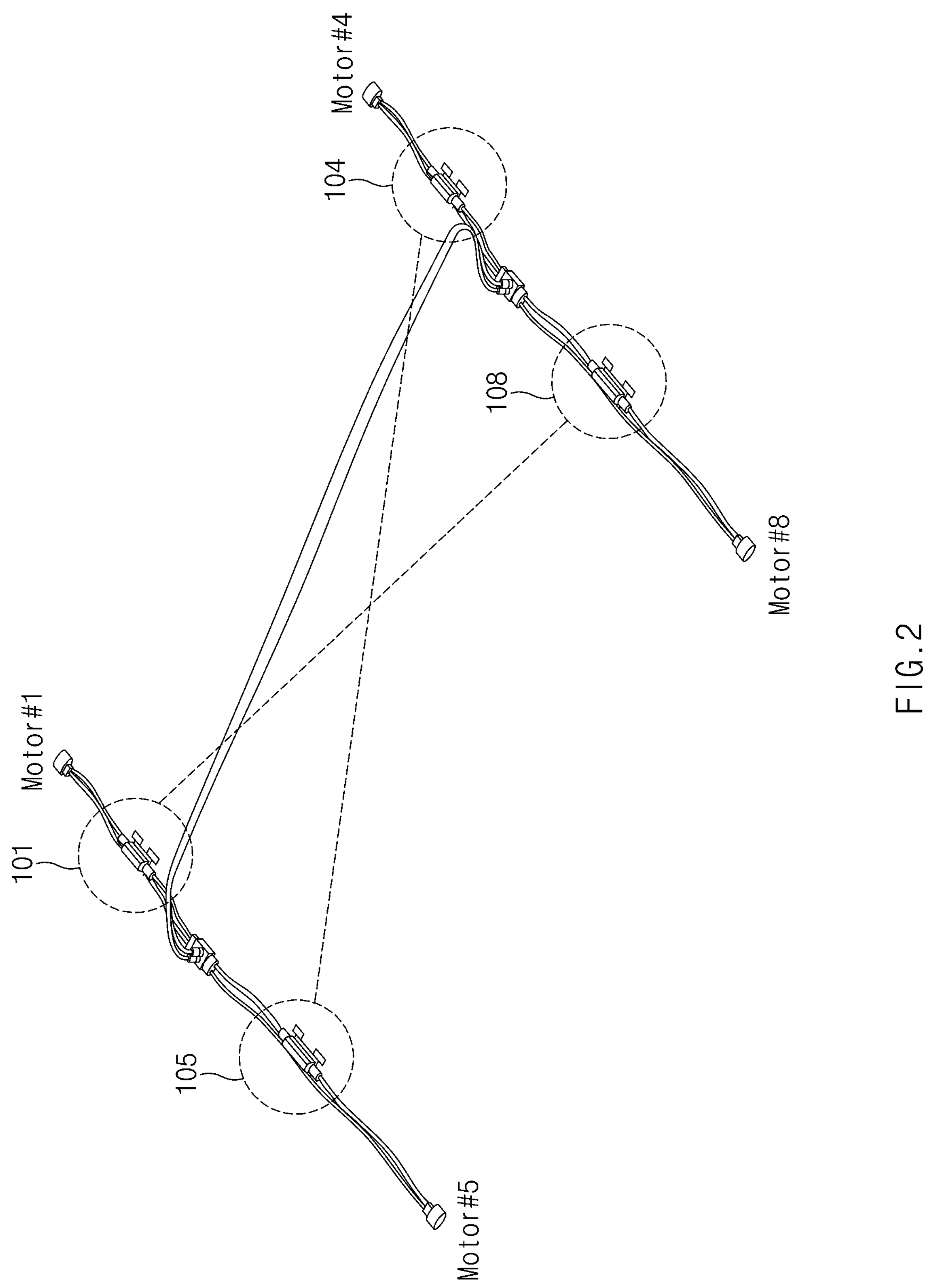
FIG. 2 illustrates a view for describing an example interlock connection relationship between propulsion devices of a flight system.
Figure 3:
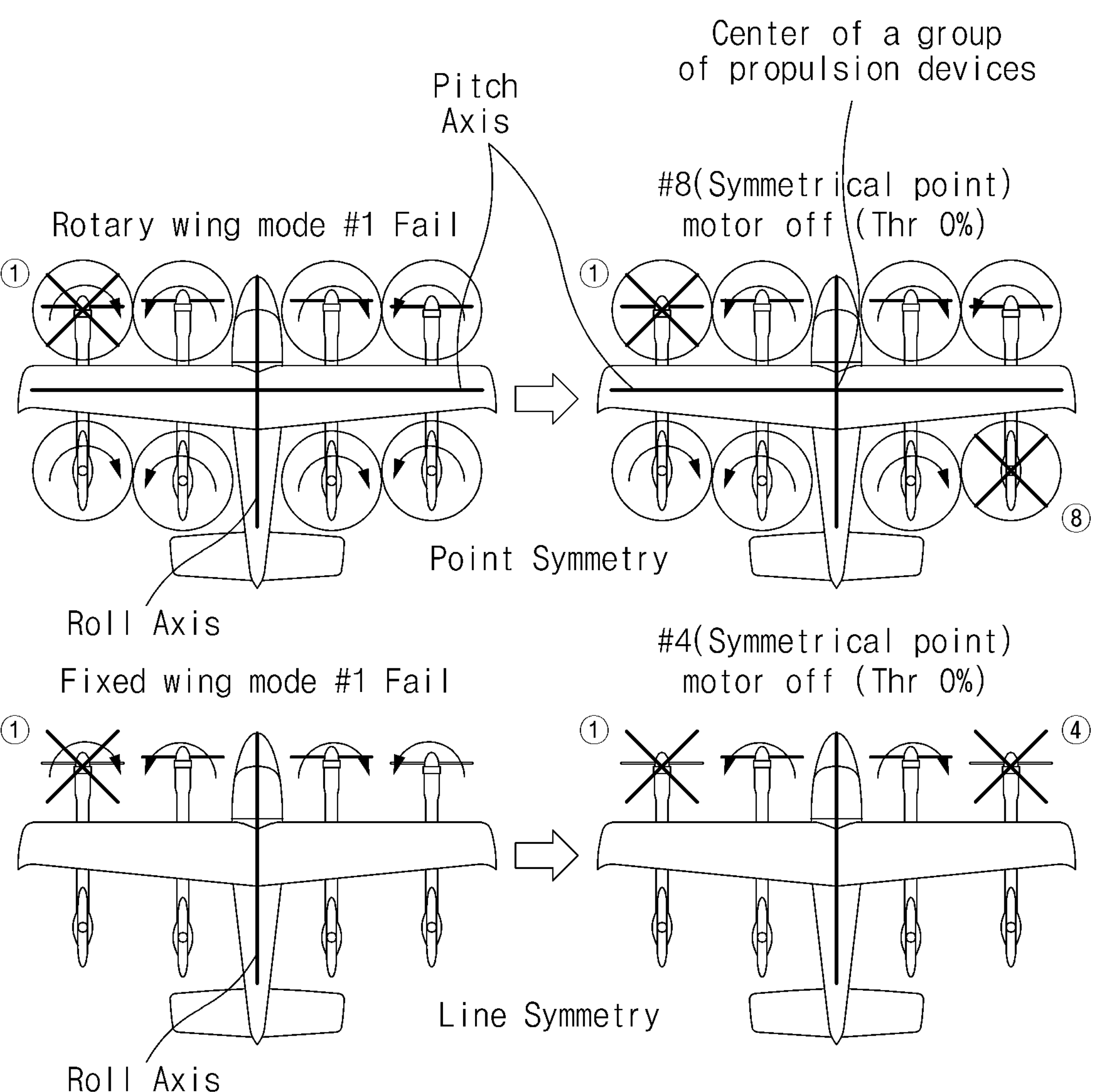
FIG. 3 illustrates a view for describing an example symmetrical control of a plurality of propulsion devices.

FIG. 2 illustrates a view for describing an example interlock connection relationship between propulsion devices of a flight system, and FIG. 3 illustrates a view for describing an example symmetrical control of a plurality of propulsion devices. The propulsion device may include at least one of a motor, a rotor, an inverter, or any combination thereof.

Referring to FIG. 2, the active fuse 101 connected to the first motor 31 may be connected to the active fuse 108 of the eighth motor 38 using an interlock line.

The interlock line may provide a function that makes states of two mechanisms (or functions) of the two connected parts to be dependent on each other, and after the active fuse 101 is cut off, the active fuse 108 connected to the interlock line may also be cut off.

The active fuse 105 connected to the fifth motor 35 may be connected to the active fuse 104 of the fourth motor 34 using another interlock line.

Although FIG. 2 illustrates examples of interlock lines of the first motor 31, the fourth motor 34, the fifth motor 35, and the eighth motor 38, the flying system may include more motors (e.g., 8 motors). For example, the flying system may further include the second motor 32, the third motor 33, the sixth motor 36, and the seventh motor 37, and a portion thereof is shown for convenience in the drawing.

The flight system 100 may apply a distributed propulsion device to maintain a safe take-off and landing performance and a safe flight control performance, and in order to ensure the safety of this distributed propulsion device (e.g., flight control maintenance), after a failure occurs in some propulsion devices (e.g., inverters, motors, rotors, etc.), according to a speed of the flying system, power to the propulsion device in a symmetric location that is determined based on a point symmetry (e.g., an origin symmetry) or a line symmetry (e.g., an X-axis symmetry or an Y-axis symmetry) may be cut off within a specific time. For example, if the speed of the flying system is lower than a first threshold speed (e.g., 0 to 50 km/h or any other speed range), the symmetric location may be determined based on the point symmetry (e.g., while the flying system is operating in a first mode (e.g., a rotary wing mode where the axis of each propeller is in parallel to the yaw axis of the flying vehicle) of the flying system shown as upper two images in FIG. 3). If the speed of the flying system is greater than or equal to the first threshold speed (e.g., greater than 50 km/h or any other speed range), the symmetric location may be determined based on the line symmetry (e.g., while the flying system is operating in a second mode (e.g., a fixed wing mode where the axis of each propeller is in parallel to the roll axis of the flying vehicle) of the flying system shown as lower two images in FIG. 3).

The point symmetry may be determined based on a reference point (e.g., the center of a group of propulsion devices shown in the upper two images of FIG. 3). The reference point may be determined based on a pitch axis and a roll axis associated with the flying system. For example, the roll axis may be the vertical axis passing through the center of a main body (e.g., fuselage) of the flying system (e.g., an aircraft, etc.) shown in the upper two images of FIG. 3. The pitch axis may be (or may be in parallel to) the horizontal axis passing through a wing of the flying system shown in the upper two images of FIG. 3.

The line symmetry may be determined based on a reference line (e.g., the vertical axis shown in the lower two images of FIG. 3). The reference line may be determined based on a roll axis associated with the flying system. For example, the roll axis may be the vertical axis passing through the center of a main body (e.g., fuselage) of the flying system (e.g., an aircraft, etc.) shown in the lower two images of FIG. 3. The yaw axis may be perpendicular to the roll axis and the pitch axis.

Referring to FIG. 3, with respect to the point symmetry (see, e.g., upper two images in FIG. 3), for example, assuming that a tilt angle is 75 to 90 degree and a flight speed is 0 to 50 km/h, power to the point-symmetrical eighth motor may also be cut off during a failure of the first motor. Although not shown in FIG. 3, with respect to the point symmetry (see, e.g., upper two images in FIG. 3), for example, assuming that a tilt angle is 75 to 90 degree and a flight speed is 0 to 50 km/h, power to the point-symmetrical seventh motor may also be cut off during a failure of the second motor, power to the point-symmetrical sixth motor may also be cut off during a failure of the third motor, and the point-symmetrical fifth motor may also be cut off during a failure of the fourth motor. On the other hand, power to the point-symmetrical fourth motor may also be cut off during a failure of the fifth motor, power to the point-symmetrical third motor may also be cut off during a failure of the sixth motor, power to the point-symmetrical second motor may also be cut off during a failure of the seventh motor, and the point-symmetrical first motor may also be cut off during a failure of the eighth motor.

With respect to the line symmetry (see, e.g., lower two images in FIG. 3), assuming that the tilt angle is 20 to 75 degree and the flight speed is 50 to 150 km/h, power to the line-symmetrical fourth motor may also be cut off during a failure of the first motor. Although not shown in FIG. 3, with respect to the line symmetry (see, e.g., lower two images in FIG. 3), for example, assuming that a tilt angle is 20 to 75 degree and a flight speed is 50 to 150 km/h, power to the line-symmetrical third motor may also be cut off during a failure of the second motor, power to the line-symmetrical second motor may also be cut off during a failure of the third motor, and power to the line-symmetrical first motor may also be cut off during a failure of the fourth motor.

If the speed of the flying system is greater than or equal to the first threshold speed but lower than a second threshold (e.g., 50 to 150 km/h or any other speed range), power to the line-symmetrical eighth motor may also be cut off during a failure of the fifth motor, power to the line-symmetrical seventh motor may also be cut off during a failure of the sixth motor, power to the line-symmetrical sixth motor may also be cut off during a failure of the seventh motor, and power to the line-symmetrical fifth motor may also be cut off during a failure of the eighth motor.

If the speed of the flying system is greater than or equal to the second threshold speed but lower than a third threshold (e.g., 150 to 240 km/h or any other speed range), the symmetric location may be determined based on the line symmetry (e.g., while the flying system is operating in the second mode (e.g., the fixed wing mode) of the flying system shown as lower two images in FIG. 3) with respect to the four front propulsion devices (e.g., including propellers) and motors (e.g., the first motor, the second motor, the third motor, and the fourth motor) without applying the operation of line-symmetric power cut-off with respect to the four rear propulsion devices (e.g., including propellers) and motors (e.g., the fifth motor, the sixth motor, the seventh motor, and the eighth motor). For example, assuming that the tilt angle is 0 to 20 degree and the flight speed is 150 to 240 km/h, power to the line-symmetrical fourth motor may also be cut off during a failure of the first motor, power to the line-symmetrical third motor may also be cut off during a failure of the second motor, power to the line-symmetrical second motor may also be cut off during a failure of the third motor, and power to the line-symmetrical first motor may also be cut off during a failure of the fourth motor.

Hereinafter, a structure of the active fuse and a changed state thereof will be described with reference to FIGS. 4-6. Hereinafter, an active fuse (first fuse box, 101) and an active fuse (second fuse box, 108) to which interlock lines are point-symmetrically connected will be described.

Figure 4:
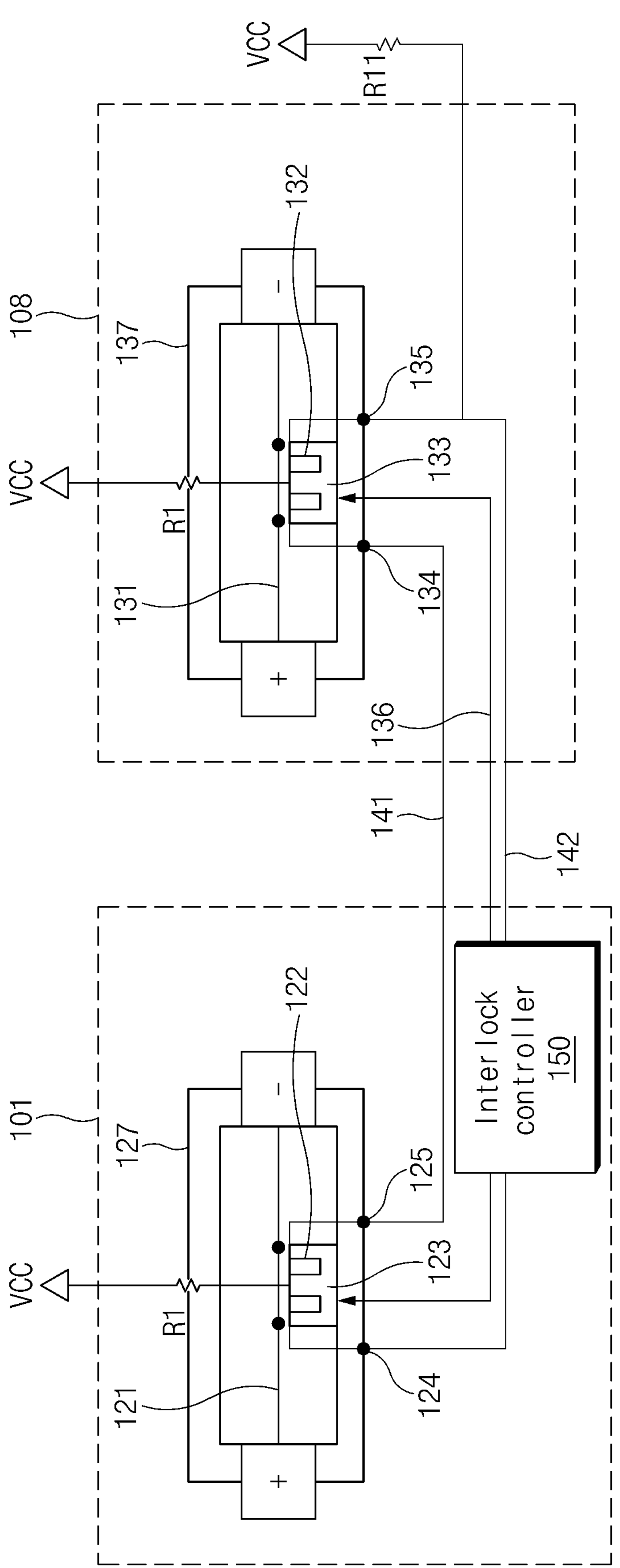
FIG. 4 illustrates an example structural diagram showing a short-circuit state of two symmetrical active fuses in a normal state.

FIG. 4 illustrates an example structural diagram showing a short-circuit state of two symmetrical active fuses in a normal state. FIG. 5 illustrates an example structural diagram showing a change in a state of a fuse during a failure of one propulsion device. FIG. 6 illustrates an example structural diagram showing an open state of two symmetrical active fuses during a failure of one propulsion device.

Referring to FIG. 4, the flight system may include the active fuse 101 and the active fuse 108 (and/or the active fuse 104, which is not shown in FIG. 4) connected using the interlock line(s), and an interlock controller 150 may be included between an interlock input terminal 124 of the active fuse 101 and an interlock output terminal 135 of the active fuse 108.

The active fuse 101 connected to the first motor 31 may include a voltage conducting portion 121, a fuse driver 122, a fuse driving controller 123, an interlock input terminal 124, an interlock output terminal 125, and a fuse case 127. A control power (e.g., via an input voltage VCC) may be applied to the active fuse 101 through a resistor R1 in the active fuse 101.

The voltage conducting portion 121 may be a line to which a voltage is applied, and a current flows after the active fuse 101 is short-circuited.

The active fuse 108 connected to the eighth motor 38 (or the active fuse 104 connected to the fourth motor 34) may be interlocked with the active fuse 101 connected to the first motor 31, and like the active fuse 101, it includes a voltage conducting portion 131, a fuse driver 132, a fuse driving controller 133, an interlock input terminal 134, an interlock output terminal 135, and a fuse case 137. The control power (e.g., via an input voltage VCC) may be applied to the active fuse 108 through a resistor R1 in the active fuse 108, and the control power may be applied to an interlock line 142 through a resistor R11.

FIG. 4 illustrates states of the active fuses 101 and 108 in a state in which both the first motor 31 and the eighth motor 38 are in a normal state. As such, in the active fuses 101 and 108 which are in normal state (e.g., a short-circuited state), the fuse drivers 122 and 132 are inserted into the fuse driving controllers 123 and 133, and thus the voltage conducting portions 121 and 131 may normally be connected to allow a current to flow.

Figure 5:
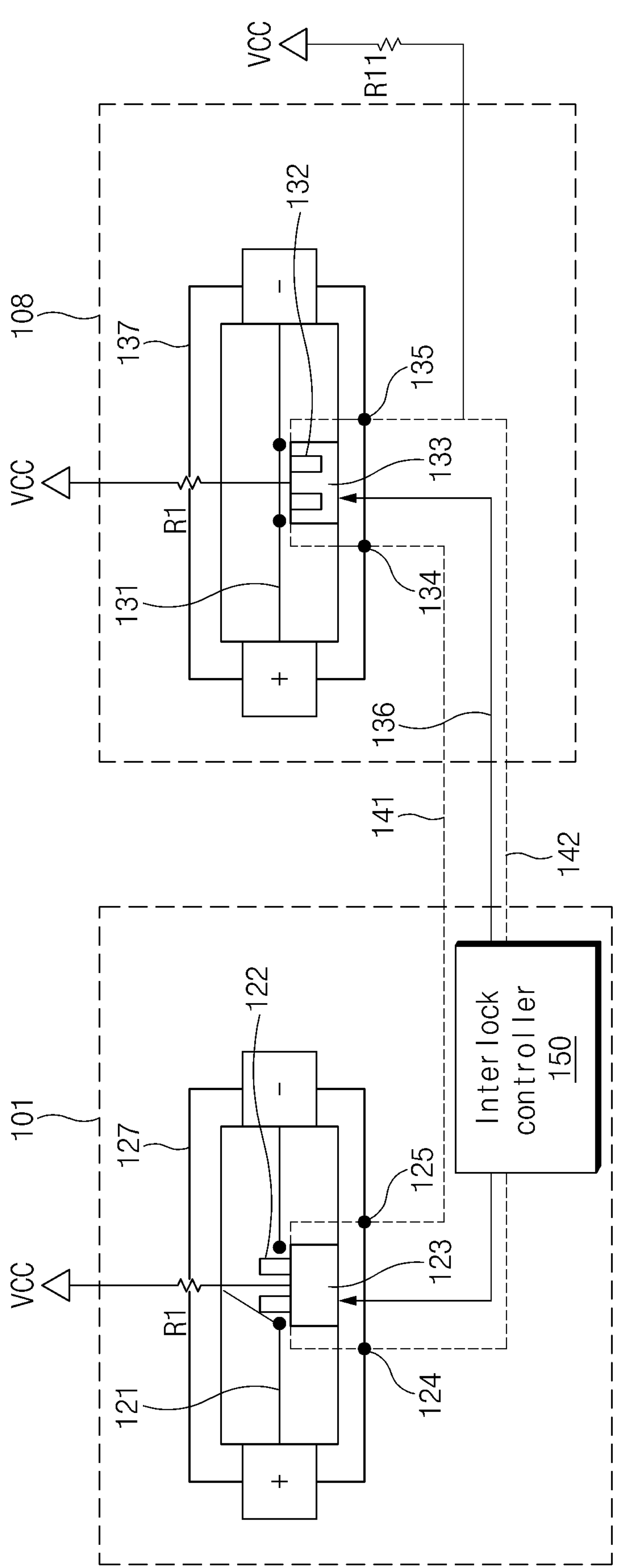
FIG. 5 illustrates an example structural diagram showing a change in a state of a fuse during a failure of one propulsion device.

If the first motor 31 is failed (e.g., as illustrated in FIG. 5), the controller 150 may apply a control power signal to the fuse driving controller 123 of the active fuse 101. Accordingly, the fuse driving controller 123 controls the fuse driver 122 so that the fuse driver 122 is led out of the fuse driving controller 123 to open the voltage conductive unit 121, thereby opening the active fuse 101. Thus, the interlock lines 141 and 142 are disconnected.

Figure 6:
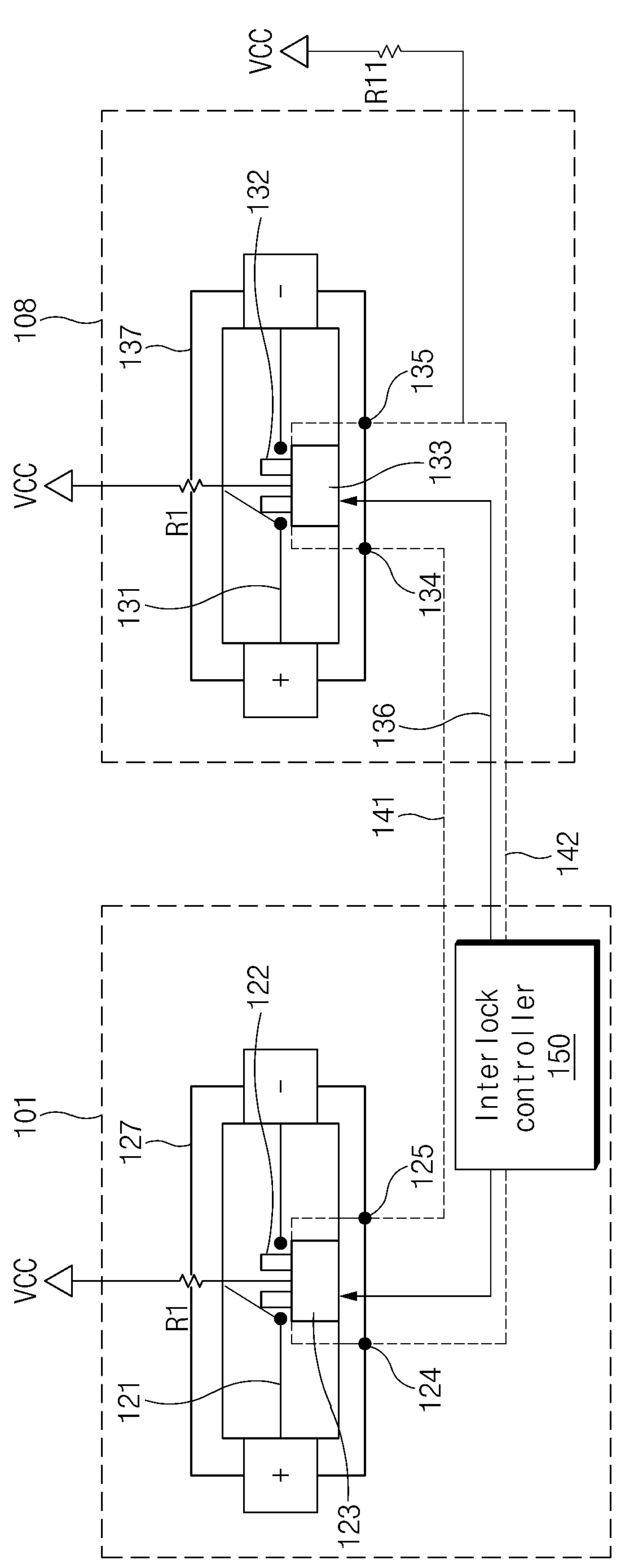
FIG. 6 illustrates an example structural diagram showing an open state of two symmetrical active fuses during a failure of one propulsion device.

Accordingly, as illustrated in FIG. 6, a ground voltage is applied to the interlock lines 141 and 142 to apply a switch (e.g., a switching element P-MOSFET) of the controller 150 is driven by the ground voltage and to apply the control power to the fuse driving controller 133 of the active fuse 108, and thus the fuse driving controller 133 is controlled (e.g., the fuse driving controller 133 protrudes the fuse driver 132 out of the fuse driving controller 133) so that the voltage conducting portion 131 is opened to open the active fuse 108.

As such, after a failure occurs in the first propulsion device (e.g., the first motor associated with the active fuse 101) and the first fuse box (active fuse 101) is opened, interlock line(s) connected between the first fuse box (active fuse 101) and the second fuse box (active fuse 101) connected to the second propulsion device (e.g., eighth motor) is opened, and thus the second fuse box (active fuse 101) is also opened so that power supply to the first motor and the eighth motor may be cut off almost simultaneously.

Figure 7:
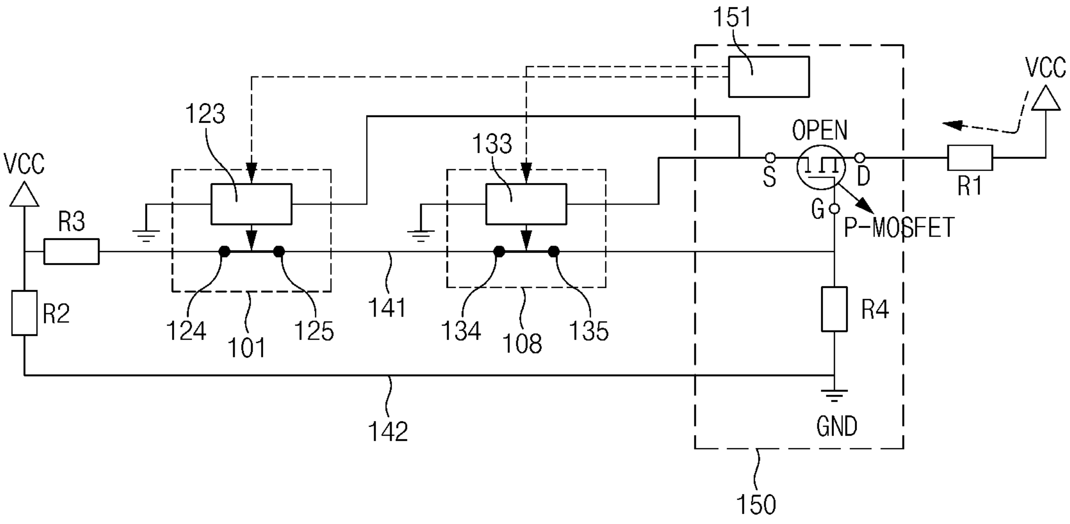
FIG. 7 illustrates a view for describing an example operation process of two active fuses in a normal state.

FIG. 7 illustrates a view for describing an example operation process of two active fuses in a normal state.

The interlock controller 150 may synchronize and control opening of the active fuses to which interlock lines are connected by controlling the interlock line(s) between the active fuses to which the interlock line(s) are connected among a plurality of active fuses.

Referring to FIG. 7, the interlock controller 150 may include a controller 151, a switch (e.g., a switching device P-MOSFET), and a resistor R4. The resistor R4 may be connected between the interlock input terminal 124 of the active fuse 101 and the interlock output terminal 135 of the active fuse 108.

The resistor R3 may be connected to the interlock input terminal 124 of the active fuse 101, a node where the control power and the resistor R3 meet may be connected to the resistor R2, and the resistor R2 may be connected to a first side of the resistor R4.

The controller 151 may communicate with an in-vehicle controller (not illustrated) to determine whether the propulsion device is failed, and in the event of a failure of the propulsion device, may transmit a control command signal to the active fuse to open the active fuse connected to the failed propulsion device.

The switching device P-MOSFET may be turned on or off according to the voltage applied to a gate terminal G to apply the control power (supplied via an applied voltage at VCC) to the fuse driving controllers 123 and 133.

The switching device P-MOSFET may be turned off after the interlock lines 141 and 142 are short-circuited, and may be turned on after the interlock lines 141 and 142 are open, to apply a control power to the fuse drivers 123 and 123.

The switching device P-MOSFET may be controlled by a voltage of the interlock input terminal 124 of the active fuse 101 and the interlock output terminal 135 of the active fuse 108 to apply a control voltage to the fuse driving controllers 123 and 133.

As illustrated in FIG. 7, in response to checking that both the active fuse 101 and the active fuse 108 are in a normal state (short-circuited), the switching device P-MOSFET is open (turned off) to not apply the control power VCC to the fuse driving controllers 123 and 133, so that the fuse driving units 123 and 123 do not operate.

Figure 8:
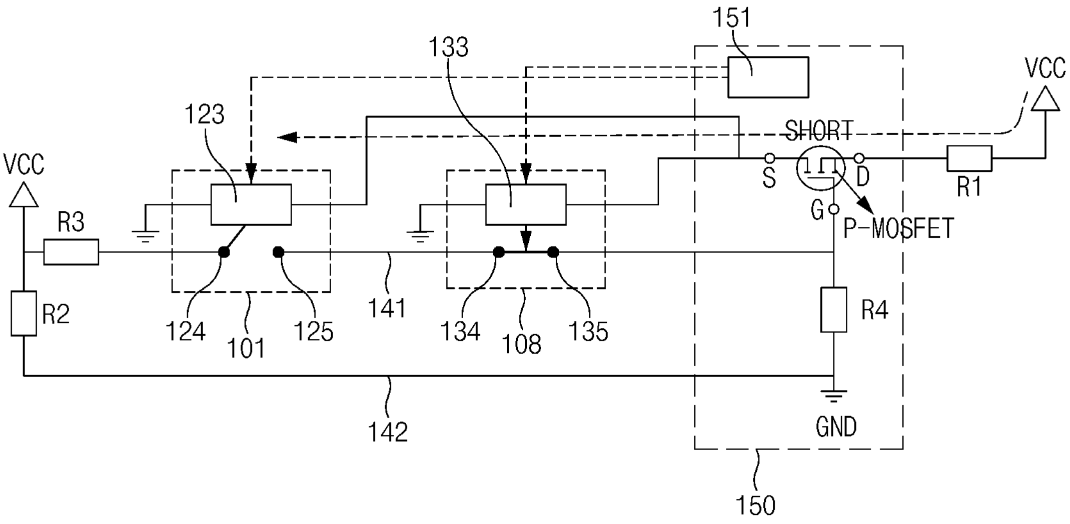
FIG. 8 illustrates a view for describing an example operation process of two active fuses in a fault state.

FIG. 8 illustrates a view for describing an example operation process of two active fuses in a fault state.

Referring to FIG. 8, after the first motor 31 is failed, the controller 151 may apply a control power signal to the fuse driving controller 123 of the active fuse 101. Accordingly, the fuse driving controller 123 drives the fuse driver 122 to open the voltage conducting portion 121, thereby opening the interlock input terminal 124 and the interlock output terminal 125. Thus, the interlock line 141 is opened to apply a voltage (e.g., a ground voltage) to the gate terminal G of the switching device P-MOSFET so that the switching device P-MOSFET is turned on (short-circuited). Accordingly, the control power (supplied via an applied voltage VCC) is applied to the fuse driving controllers 123 and 133 via the resistor R1 and the switching device P-MOSFET. Thus, the fuse driving controller 133 drives the fuse driver 132 to open the voltage conducting portion 131, thereby opening the interlock input terminal 134 and the interlock output terminal 135. As a result, a voltage of both the active fuses 101 and 108 may be cut off, so that the voltage applied to the first motor 31 and the eighth motor 38 connected thereto may be cut off.

Figure 9:
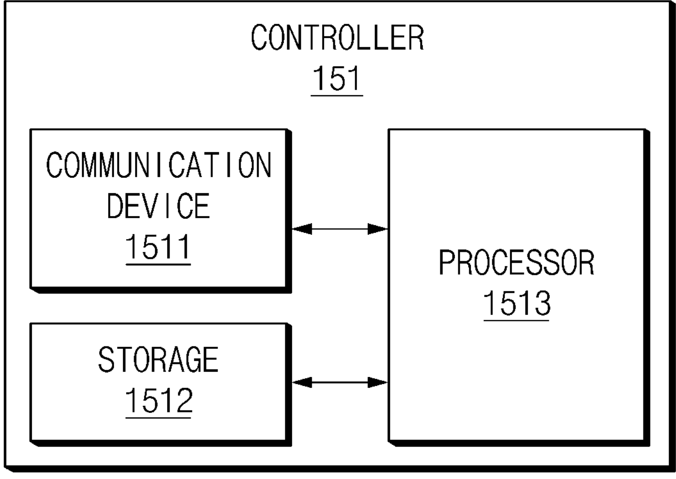
FIG. 9 illustrates a detailed configuration diagram of an example controller.

FIG. 9 illustrates a detailed configuration diagram of an example controller 151.

The controller 151 may include a communication device 1511, a storage 1512, and a processor 1513.

The communication device 1511 may be a hardware device implemented with various electronic circuits to transmit and receive signals through a wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like. As an example, the communication device 1511 may receive failure information of the propulsion device, and may transmit a control power signal to the fuse driving controller 123. In this case, the control power signal may be an enable signal for starting driving of the fuse driving controller 123.

The storage 1512 may store data and/or algorithms required for the processor 1413 to operate, and the like.

The storage 1512 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 1513 may be electrically connected to the communication device 1511, the storage 1512, and the like, may electrically control each component, and may be an electrical circuit that executes software commands, thereby performing various data processing and calculations described below.

The processor 1513 may use failure information of the propulsion device received from other controllers of the flight system 100 to determine the propulsion device in which the failure has occurred, and may transmit an enable signal for driving the fuse driving controller of the active fuse connected to the failed propulsion device to the fuse driving controller.

As such, according to the present disclosure, after the distributed propulsion device of the flight means is failed, a fuse box of the failed propulsion device and a fuse box of the point-symmetric or X-axis-symmetric propulsion device may be interlocked using interlock lines, and in response to opening of a first one of the fuse boxes to cut off the motor power, a second fuse box may be automatically open to cut off the power to the corresponding motor together, and thus even though the propulsion device of the flight system is failed, it may be promoted to ensure safe flight.

A flight system may include: a plurality of fuse boxes configured to control application of a voltage to at least one propulsion device; and an interlock control apparatus configured to control interlock lines between fuse boxes connected using the interlock lines among the fuse boxes to synchronize and control opening of the fuse boxes connected using the interlock lines.

Among the fuse boxes, at least two fuse boxes may be synchronized point-symmetrically or X-axis symmetrically to be connected using the interlock lines.

The fuse boxes may each be configured to include: a high voltage conducting portion to which a voltage is applied; a fuse driver configured to protrude to open the high voltage conducting portion; and a fuse driving controller configured to control driving of the fuse driver.

The flight system may further include: an interlock line input terminal configured to receive a voltage from an interlock line of a corresponding fuse box; and an interlock line output terminal configured to output a voltage to the interlock line of the corresponding fuse box.

The fuse driver may be configured to be inserted into the fuse drive controller and then to protrude by being controlled by the fuse driving controller.

A first propulsion device of the at least one propulsion device may be configured to be connected to a first fuse box of the fuse boxes, a second propulsion device of the at least one propulsion device may be configured to be connected to a second fuse box of the fuse boxes, and in response to checking that the first fuse box and the second fuse box are connected using interlock lines, the first fuse box and the second fuse box may be configured to be in an unlocked state during normal states of the first propulsion device and the second propulsion device.

In response to opening of the first fuse box by a failure of the first propulsion device, the interlock lines connected between the first fuse box and the second fuse box may be configured to be opened.

In response to opening of the interlock line connected between the first fuse box and the second fuse box, the second fuse box may be configured to be opened by the interlock control apparatus.

The interlock control apparatus may be configured to be connected between the interlock lines of the first fuse box and the second fuse box.

The interlock control apparatus may be configured to be connected between an interlock input terminal of the first fuse box and an interlock output terminal of the second fuse box.

The interlock control apparatus may be configured to include a switching device configured to be turned off in response to a short-circuit of the interlock lines, and to be turned on in response to opening of the interlock lines, to apply a control power to a fuse driving controller of the first fuse box and a fuse driving controller of the second fuse box.

The switching device may be configured to be controlled by voltages of an interlock input terminal of the first fuse box and an interlock output terminal of the second fuse box, to apply a control voltage to the fuse driving controller of the first fuse box and the fuse driving controller of the second fuse box.

The flight system may further include a controller configured to transmit, in response to a failure of the at least one propulsion device, an enable signal to a fuse driving controller of a fuse box connected to a failed propulsion device.

The flight system may further include a resistor configured to have opposite ends connected to an interlock input terminal of the first fuse box and an interlock output terminal of the second fuse box.

The fuse box may include an active fuse.

The propulsion device may include at least one of a motor, a rotor, an inverter, or any combination thereof.

The at least one propulsion device and at least one corresponding fuse box may be configured to be tied in pairs and connected using the interlock lines, and in response to a failure of the at least one propulsion device, a fuse box connected to a failed propulsion device and the pair of fuse boxes tied with the interlock lines may be opened together to cut off power to both the failed propulsion device and another propulsion device connected to the failed propulsion device that did not fail.

A failure responding method for a flight system that is configured to include a plurality of fuse boxes for controlling application of a voltage to at least one propulsion device and to connect interlock lines between corresponding fuse boxes among the fuse boxes, the method including synchronizing and controlling opening of the fuse boxes to which the interlock lines are connected by controlling opening of the interlock lines.

In the synchronizing and controlling of the opening of the fuse boxes to which the interlock lines are connected, a first propulsion device of the at least one propulsion device may be configured to be connected to a first fuse box of the fuse boxes, a second propulsion device of the at least one propulsion device may be configured to be connected to a second fuse box of the fuse boxes, and in response to checking that the first fuse box and the second fuse box are connected using interlock lines, the first fuse box and the second fuse box may be configured to be in an unlocked state during normal states of the first propulsion device and the second propulsion device.

In the synchronizing and controlling of the opening of the fuse boxes to which the interlock lines are connected, in response to opening of the first fuse box by a failure of the first propulsion device, the interlock lines connected between the first fuse box and the second fuse box may be configured to be opened.

Figure 10:
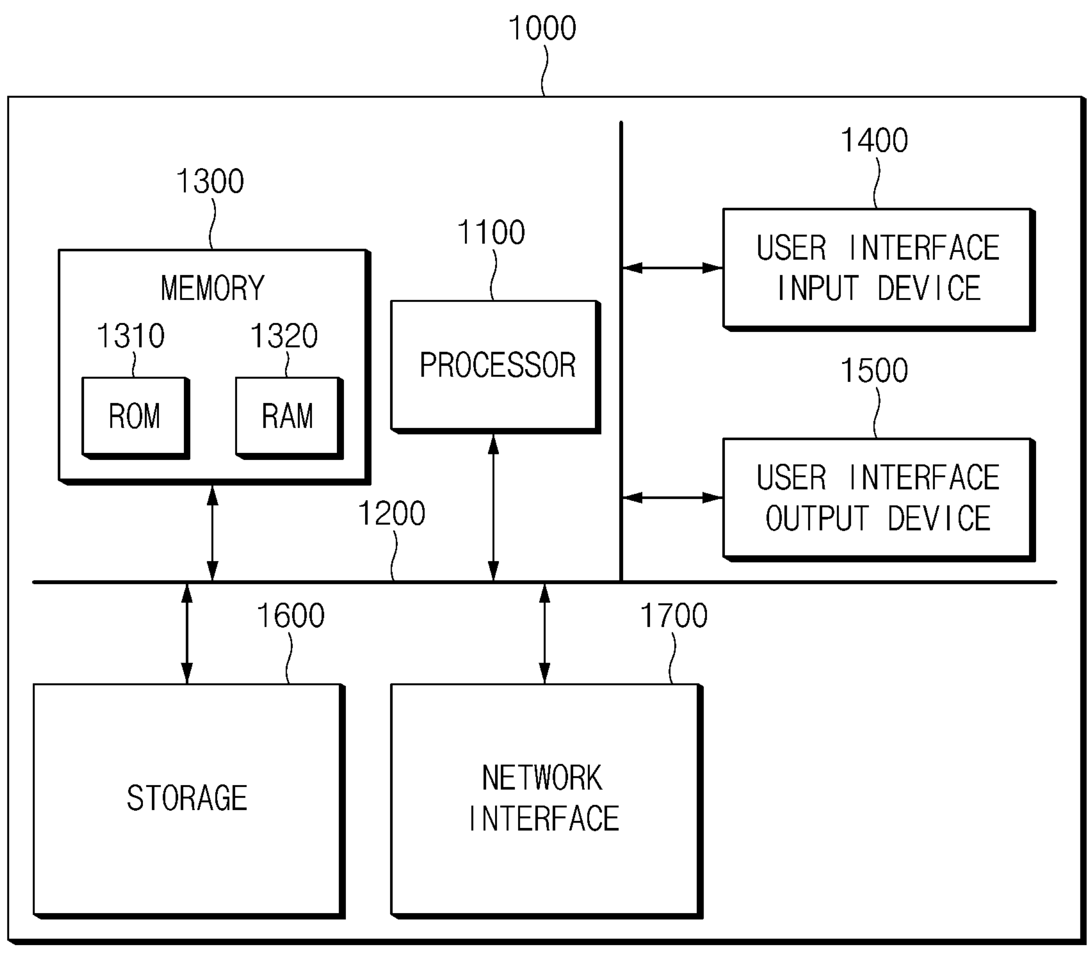
FIG. 10 illustrates an example computing system.

FIG. 10 illustrates an example computing system.

Referring to FIG. 10, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the features disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively or additionally, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, various examples disclosed in the present disclosure are not intended to limit the technical ideas of the present disclosure, but to explain them, and the scope of the technical ideas of the present disclosure is not limited by specific examples. The protection range of the present disclosure should be interpreted by the claims below, and all technical ideas within the equivalent range should be interpreted as being included in the scope of the present disclosure.

What is claimed is:

1. A flight system comprising:
a plurality of fuse boxes, wherein each fuse box, of the plurality of fuse boxes, is configured to control application of a voltage to at least one propulsion device of a plurality of propulsion devices; and
an interlock control apparatus configured to control connection of at least one interlock line between at least two fuse boxes, of the plurality of fuse boxes, connected via the at least one interlock line to synchronize control opening of the at least two fuse boxes,
each of the plurality of fuse boxes is configured to be connected with a corresponding one of the plurality of propulsion devices, and fuse boxes of the plurality of fuse boxes are connected to an interlock line and synchronized with each other,
wherein the interlock control apparatus comprises a switching device configured to be turned off based on a short-circuit of the at least one interlock line.

2. The flight system of claim 1, wherein:
the flight system is comprised in a flying vehicle; and
at least two propulsion devices associated with the at least two fuse boxes are symmetrically positioned based on:
a line symmetry associated with a roll axis of the flying vehicle; or
a point symmetry associated with a center of the plurality of propulsion devices.

3. The flight system of claim 1, wherein:
each of the at least two fuse boxes comprises:
a voltage conducting portion to which a voltage is applied;
a fuse driver configured to open the voltage conducting portion; and
a fuse driving controller configured to control the fuse driver.

4. The flight system of claim 1, further comprising:
an interlock line input terminal configured to receive a voltage from an interlock line of a corresponding fuse box of the at least two fuse boxes; and
an interlock line output terminal configured to output a voltage to the interlock line of the corresponding fuse box.

5. The flight system of claim 3, wherein the fuse driver is configured to be inserted into the fuse drive controller and to be protruded by being controlled by the fuse driving controller.

6. The flight system of claim 1, wherein:
a first propulsion device of the plurality of propulsion devices is coupled to a first fuse box of the at least two fuse boxes,
a second propulsion device of the plurality of propulsion devices is coupled to a second fuse box of the at least two fuse boxes, and
based on the first fuse box and the second fuse box being coupled to each other via the at least one interlock line, the first fuse box and the second fuse box are configured to be in closed states during normal operating states of the first propulsion device and the second propulsion device.

7. The flight system of claim 6, wherein:
in response to opening of the first fuse box by a failure of the first propulsion device, the at least one interlock line coupled between the first fuse box and the second fuse box is configured to be opened; and
in response to opening of the at least one interlock line coupled between the first fuse box and the second fuse box, the second fuse box is configured to be opened by the interlock control apparatus to cut off power to the second propulsion device.

8. The flight system of claim 6, wherein:
the interlock control apparatus is coupled between the first fuse box and the second fuse box via the at least one interlock line.

9. The flight system of claim 6, wherein:
the interlock control apparatus is coupled to an interlock input terminal of the first fuse box and an interlock output terminal of the second fuse box.

10. The flight system of claim 6, wherein:
the switching device is further configured to be:
turned on based on opening of the at least one interlock line, to apply a control power to a fuse driving controller of the first fuse box and a fuse driving controller of the second fuse box.

11. The flight system of claim 10, wherein:
the switching device is configured:
to be controlled by voltages of an interlock input terminal of the first fuse box and an interlock output terminal of the second fuse box, and
to apply a control voltage to the fuse driving controller of the first fuse box and the fuse driving controller of the second fuse box.

12. The flight system of claim 10, further comprising:
a controller configured to transmit, based on a failure of the at least one propulsion device, an enable signal for enabling a fuse driving controller to a fuse driving controller of a fuse box connected to a failed propulsion device.

13. The flight system of claim 12, further comprising:
a resistor having a first end connected to an interlock input terminal of the first fuse box and having a second end connected to an interlock output terminal of the second fuse box.

14. The flight system of claim 1, wherein:
each of the at least two fuse boxes comprises an active fuse.

15. The flight system of claim 1, wherein:
the at least one propulsion device comprises at least one of a motor, a rotor, an inverter, or any combination thereof.

16. The flight system of claim 1, wherein the flight system is configured to:
control, based on a failure of a first propulsion device of the at least one propulsion device, a first fuse box connected to the first propulsion device and a second fuse box coupled to the first fuse box via the at least one interlock line to be opened to cut off power to both the first propulsion device and a second propulsion device coupled to the second fuse box.

17. A method performed by a flight system, the method comprising:
applying a voltage to at least one propulsion device of a plurality of propulsion devices, wherein each propulsion device of the plurality of propulsion devices is coupled to a fuse box of a plurality of fuse boxes, and wherein at least two fuse boxes of the plurality of fuse boxes are coupled via at least one interlock line between the at least two fuse boxes;
synchronizing and controlling opening of the at least two fuse boxes by controlling opening of the at least one interlock line; and
turning off a switching device based on a short-circuit of the at least one interlock line.

18. The method of claim 17, further comprising:

based on a first fuse box of the at least two fuse boxes and a second fuse box of the at least two fuse boxes being coupled to each other via the at least one interlock line, controlling the first fuse box and the second fuse box to be in closed states during normal operating states of a first propulsion device of the plurality of propulsion devices and a second propulsion device of the plurality of propulsion devices, wherein the first propulsion device is coupled to the first fuse box, and wherein the second propulsion device is coupled to the second fuse box, wherein each of the plurality of fuse boxes is configured to be connected with a corresponding one of the plurality of propulsion devices, and paired fuse boxes of the plurality of fuse boxes are connected to an interlock line and configured to operate in synchronization.

19. The method of claim 18, further comprising:

in response to opening of the first fuse box by a failure of the first propulsion device, controlling opening of at least one interlock line coupled between the first fuse box and the second fuse box.

20. A flight system comprising:

a plurality of fuse boxes, wherein each fuse box, of the plurality of fuse boxes, is configured to control application of a voltage to a propulsion device of a plurality of propulsion devices; and a controller circuit configured to control connection of an interlock line between paired fuse boxes, of the plurality of fuse boxes, connected via the interlock line to synchronize control opening of the paired fuse boxes, wherein, the paired fuse boxes comprises a first fuse box and a second fuse box, wherein the controller circuit comprises a switch configured to be:

turned off based on a first state associated with the paired fuse boxes, and turned on based on a second state associated with at least one of the paired fuse boxes, to apply a control power to a driving controller of the first fuse box and a driving controller of the second fuse box.

* * * * *